United States Patent
Boden

[11] Patent Number: 5,781,273
[45] Date of Patent: Jul. 14, 1998

[54] RETAINER SYSTEM FOR REPLACING EXISTING EYEGLASS TEMPLES

[76] Inventor: Robert O. Boden, 1580 Gaywood Dr., Altadena, Calif. 91001

[21] Appl. No.: 777,283

[22] Filed: Dec. 27, 1996

[51] Int. Cl.⁶ .................................... G02C 3/00
[52] U.S. Cl. .................. 351/156; 351/142; 351/157
[58] Field of Search .................. 351/156, 157, 351/153, 140, 142

[56] References Cited

U.S. PATENT DOCUMENTS

| | | |
|---|---|---|
| 1,819,738 | 8/1931 | Daniels . |
| 2,481,946 | 9/1949 | Pendleton . |
| 2,539,922 | 1/1951 | Nyberg . |
| 3,450,467 | 6/1969 | Phillips . |
| 3,502,396 | 3/1970 | Greenberg . |
| 3,827,790 | 8/1974 | Wenzel . |
| 3,874,776 | 4/1975 | Seron . |
| 3,879,804 | 4/1975 | Lawrence . |
| 4,133,604 | 1/1979 | Fuller . |
| 4,881,803 | 11/1989 | Giles et al. ........... 351/157 |
| 4,930,885 | 6/1990 | Laschober ............ 351/156 |
| 5,268,710 | 12/1993 | Anstey ................ 351/156 |

*Primary Examiner*—Hung X. Dang
*Attorney, Agent, or Firm*—Darby & Darby, P.C.

[57] ABSTRACT

An eyewear retainer to be attached to the forward lens carrying frame of a pair of eyeglasses in substitution for the usual temples. The retainer has two flexible elongated elements connectible at their forward ends to the usual frame carried hinge elements, and which extend rearwardly about the head and are detachably and adjustably connected together at the back of the head, preferably by velcro fastener pads. The elongated elements may be formed as flexible plastic tubes, carrying connectors at their forward ends adapted to extend through openings in the frame carried hinge elements and be retained against separation therefrom.

22 Claims, 2 Drawing Sheets

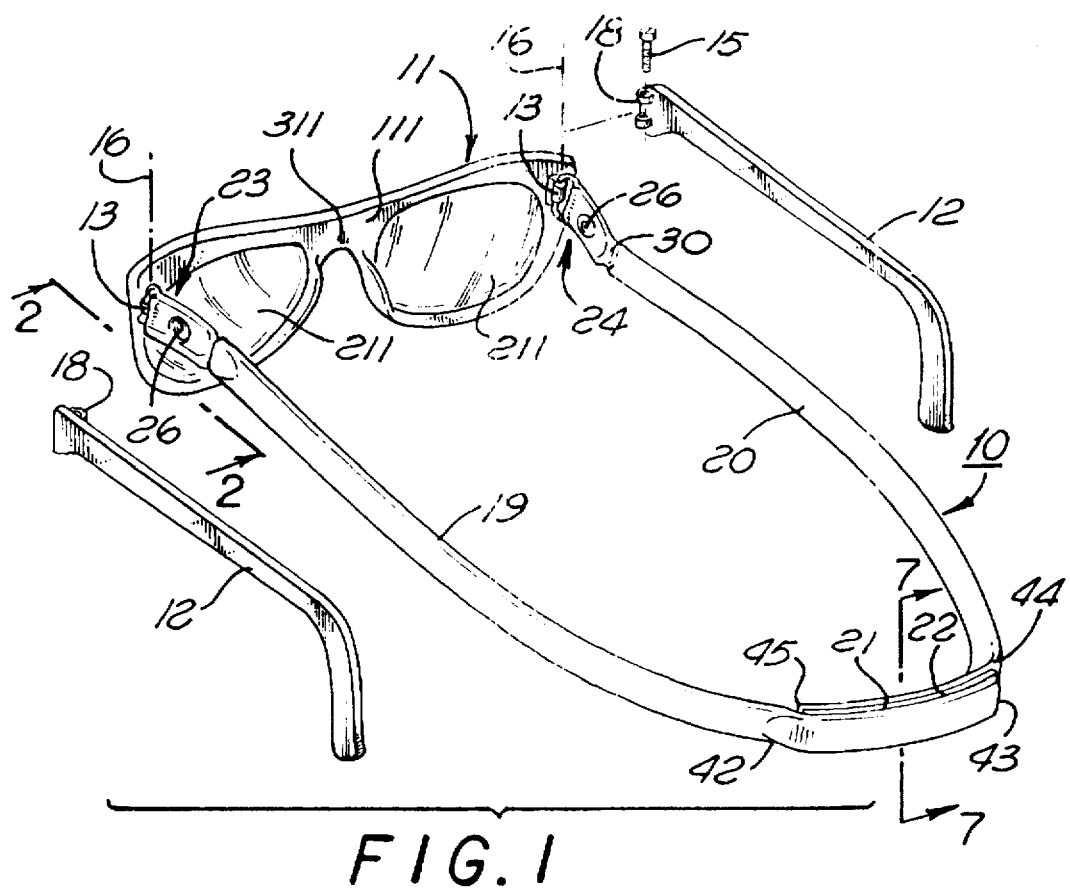
FIG. 1
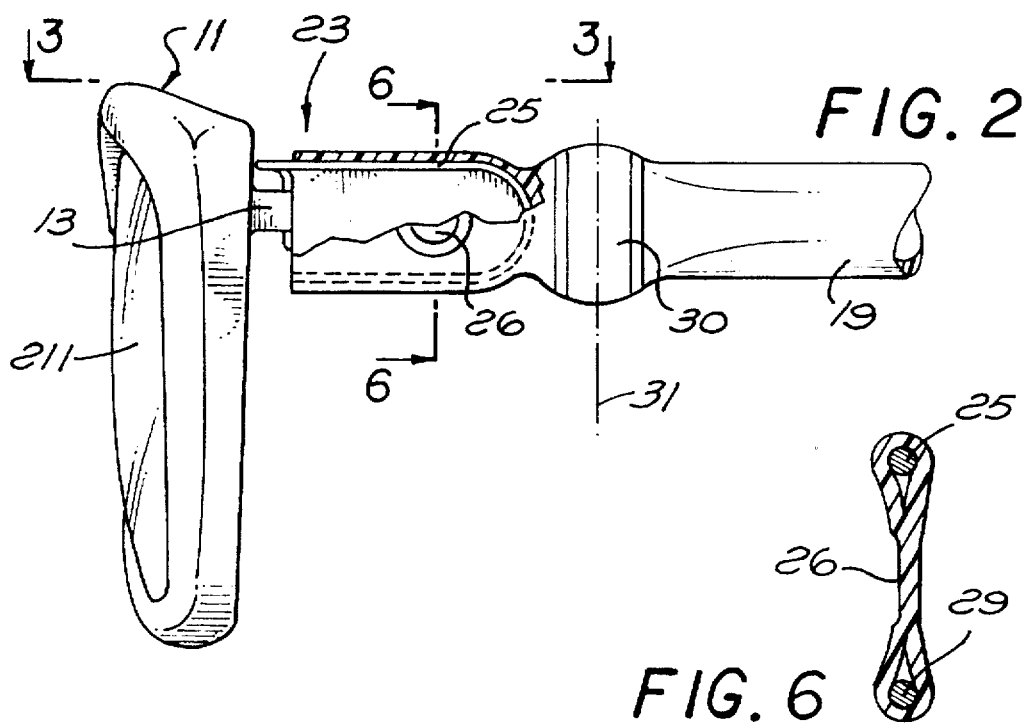
FIG. 2
FIG. 6

5,781,273

1

RETAINER SYSTEM FOR REPLACING EXISTING EYEGLASS TEMPLES

This invention relates to improved retainers or leashes for holding an eyeglass frame on a user's head, or for retaining the eyeglasses about the neck of a person when not in use.

BACKGROUND OF THE INVENTION

Persons who must wear glasses while participating in sports or other active pursuits often find it difficult to keep the glasses in proper position on the head, and may be seriously distracted by the necessity to repeatedly reposition the glasses. Even those in more passive activities may be bothered, though to a lesser extent, by the tendency for glasses to slide or slip from a desired positioning. Also, conventional temples often bother a user by the manner in which they hook onto the ears or apply force to the ears or the head.

U.S. Pat. No. 4,133,604 issued Jan. 9, 1979 to Robert B. Fuller on "Eyeglass Retainer" shows a retainer device consisting of an elastic band which is attachable to the temples of a pair of glasses, and which extends about the back of the user's head to retain the glasses on the head. This band has sleeve portions at its opposite ends which are received about and thereby secured to the temples. Various other similar expedients have been proposed in the past, including some in which the length of a band or strap extending across the back of the head is adjustable, to vary the size of the device for different wearers.

SUMMARY OF THE INVENTION

The present invention provides an improved eyeglass retainer which is more comfortable and more conveniently and easily applied to and removed from the head than are the prior art devices with which I am familiar. A retainer embodying the invention may have only very soft and pliable surfaces which contact the user's head to avoid the above discussed discomfort which accompanies engagement of the usual hooked temple ends with the ears and the head. When the retainer is in use, the conventional hard temples may be removed completely from the glasses. Also, the device of the invention is so designed as to be attachable universally to virtually any type of glasses currently on the market.

Structurally, the retainer includes two elongated flexible elements or straps, preferably taking the form of flexible plastic tubes, attachable at their forward ends to frame carried hinge elements, and detachably and adjustably connectible together at the back of the head, desirably by velcro fastening elements. The forward ends of the tubes may be attached to the frame by unique connectors having portions adapted to extend through openings in the frame carried hinge elements, and be retained in those openings to secure the parts together during use. Each of these connectors may be formed as a wire having an end which extends through the hinge opening and is then bendable to a condition locking the parts together. An opposite end of the wire may extend into the forward end of a corresponding one of the flexible plastic tubes, and be secured permanently thereto by ultrasonically or otherwise bonding together opposed portions of the side wall of the tube. Between its opposite ends, the wire may be bent to form a stop portion engageable with the frame of the glasses to limit pivotal movement of the connector relative to the frame.

BRIEF DESCRIPTION OF THE DRAWINGS

The above and other features and objects of the invention will be better understood from the following detailed description of the typical embodiment illustrated in the accompanying drawings, in which:

FIG. 1 is a perspective view of a retainer attached to the lens carrying frame of a pair of eyeglasses, with the conventional temples illustrated as detached from the frame;

FIG. 2 is an enlarged fragmentary side view, partially broken away, of a forward portion of the retainer taken primarily on line 2—2 of FIG. 1;

FIG. 6 is an enlarged vertical section taken on line 6—6 of FIG. 2;

DESCRIPTION OF THE PREFERRED EMBODIMENT

Figure 4:
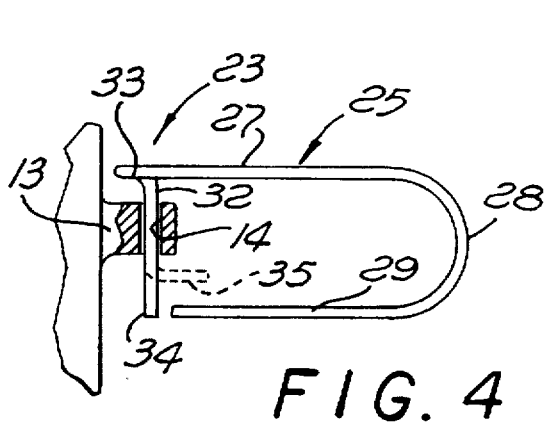
FIG. 4 is a fragmentary vertical section taken primarily on line 4—4 of FIG. 3, showing one of the connector wires of the device, and with the forward end of an associated one of the flexible tubes omitted from the view to better illustrate the shape of the wire.
Figure 5:
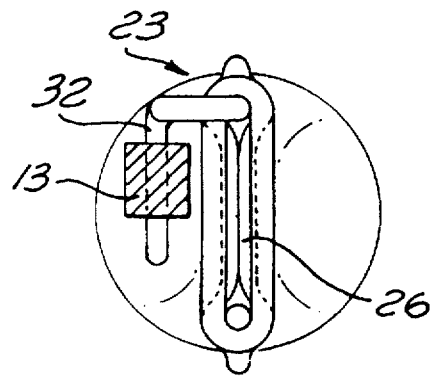
FIG. 5 is a vertical section taken on line 5—5 of FIG. 3.

FIG. 1 shows an eyewear retainer or leash 10 embodying the invention attached to the forward frame structure 11 of a conventional pair of eyeglasses in substitution for the usual temples 12 initially connected to the forward structure 11. Structure 11 includes a frame 111 carrying two lenses 211 and having a nose piece portion 311 adapted to extend across the bridge of the nose. At its opposite sides, frame 111 carries two hinge elements 13 containing vertical cylindrical openings 14 (see FIG. 4) through which screws 15 (FIG. 1) can extend vertically to attach temples 12 to hinge elements 13 for relative pivotal movement about two vertical axes 16. Temples 12 carry at their forward ends a second pair of hinge elements 18, each of which may have portions received above and beneath a corresponding one of the frame carried hinge elements 13, and each of which contains an opening for receiving screw 15 to make the pivotal connection between the temple and frame. Screw 15 is threadedly connected to hinge element 18 to hold the screw in place for maintaining the pivotal connection.

In placing the retainer 10 in use, screws 15 and temples 12 are removed from the forward frame structure 11, and retainer 10 is attached to the frame carried hinge elements 13 as shown. The device 10 includes two similar elongated strap like elements 19 and 20 which extend rearwardly along opposite sides of the user's head and carry velcro pads 21 and 22 at the back of the head for detachably and adjustably connecting elements 19 and 20 together. The elements 19 and 20 are preferably flexible and soft to conform to the user's head, and for best results are formed of flexible tubing of a resinous plastic material, desirably flexible polyvinylchloride tubing. The forward ends of tubes 19 and 20 carry two connectors 23 and 24 which are attachable pivotally to hinge elements 13 of the frame. The structure of one of these connectors, specifically the left hand connector 23 as viewed in FIG. 1, is illustrated in some detail in FIGS. 2 through 6. The second connector 24 (FIG. 8) may be considered as a mirror image of the specifically illustrated connector 23.

Connector 23 is preferably formed of a single length of metal wire of circular cross section which is bent to the configuration illustrated in the figures and has sufficient stiffness to remain in that shape during use of the device. The wire is attached to the forward end of plastic tube 19 by extension of a portion 25 of the wire of connector 23 into the end of the tube and by then bonding opposite side wall portions of the tube together in a flattened condition at 26, as by ultrasonic bonding at that location. The portion 25 of the wire connector which extends into the forward end of tube 19 is bent to have an upper straight horizontal portion 27 merging with a return bend portion 28 defining a 180 degree curve leading to a second straight horizontal portion 29 at the end of the wire disposed parallel to and beneath upper horizontal portion 27. The region 26 at which opposite side wall portions of the tube are ultrasonically or otherwise bonded together is located vertically between the upper and lower horizontal portions 27 and 29 of the connector wire and forwardly of return bend portion 28 to effectively lock the connector against forward removal from tube 19. The ultrasonic weld 26 is also preferably circular as shown, to have a peripheral curvature at its rear side corresponding essentially to the curvature of return bend portion 28 of the wire. At a location spaced slightly rearwardly of return bend portion 28 of connector wire 23, the opposite side walls of tube 19 are ultrasonically or otherwise bonded together at a second area 30 which extends vertically through the entire height of the flattened tube and closes the portion of the tube rearwardly of the location 30 against communication between the interior of the tube behind location 30 and the exterior of the tube. Also, the flattened vertically extending region 30 acts as a hinge allowing flexure of the portion of the tube behind the location 30 relative to the portion of the tube forwardly of that location about a vertical axis 31 extending through the region 30.

The portion of connector wire 23 which extends forwardly beyond and out of tube 19 has a portion 32 which initially extends directly vertically from a location 33 (FIG. 4) to a lower extremity 34 of the wire. During attachment of connector 23 to the forward frame structure 11 of the eyeglasses, projection 32 is inserted downwardly through opening 14 in hinge element 13 to the position illustrated in full lines in FIG. 4. The lower end of portion 32 of the wire is then bent by pliers or another tool to the horizontally projecting position represented in broken lines at 35 in FIG. 4, to thus prevent upward removal of the wire from hinge element 13 and form a permanent pivotal connection between tube 19 and forward frame structure 11 allowing tube 19 and its connected parts to swing about the vertical axis 16 of hinge element 13 between a position such as that represented in FIG. 1 and a folded position in which tube 19 is adjacent frame structure 11. Preferably, the portion 32 of connector wire 23 has an external diameter slightly less than the internal diameter of vertical cylindrical opening 14 in hinge element 13, to allow some looseness in the connection between element 23 and the forward frame structure so that the frame structure may shift slightly to an optimum position relative to the user's face.

Figure 3:
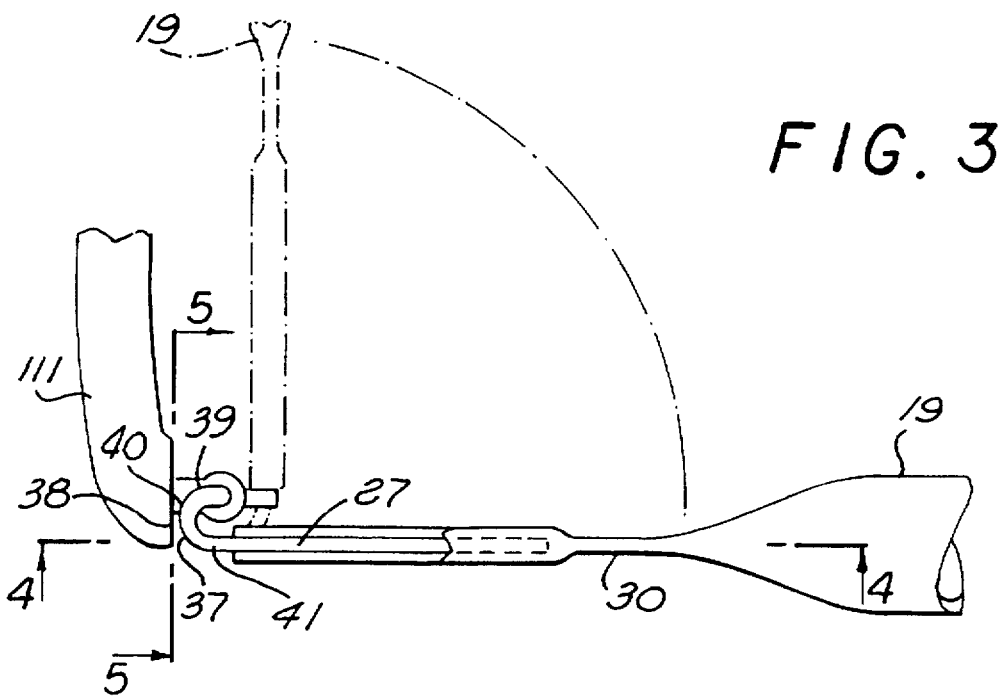
FIG. 3 is a fragmentary plan view taken on line 3—3 of FIG. 2.

At the upper end of portion 32 of connector wire 23, that wire is bent to the condition represented in FIG. 3 to form a stop shoulder 37 engageable with a rear surface 38 of frame 111 in a relation limiting the pivotal movement of tube 19 in the position illustrated in FIG. 3. More particularly, the stop shoulder prevents tube 19 and its connector 23 from swinging in a clockwise direction relative to frame 111 beyond the full line position of FIG. 3. Tube 19 and its connector 23 can, however, swing in a counterclockwise direction through approximately 90 degrees to the position represented in broken lines in FIG. 3 in which tube 19 is closely adjacent frame 111. To form the stop shoulder, the wire extends forwardly from the upper end of vertical portion 32 of the wire, as represented at 39 in FIG. 3, then laterally at 40 along a curving path, and then back rearwardly at 41 to merge with the previously described horizontal portion 27 of the wire. The stop shoulder 37 engageable with the frame to limit pivotal movement is formed by the forward curved side of portion 40 of the wire.

Figure 8:
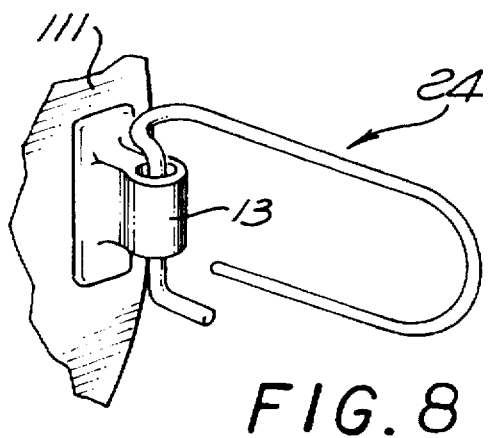
FIG. 8 is a perspective view of one of the connector wires of the device.

As mentioned previously, connector wire 24 at the right side of the assembly of FIG. 1 is shaped in correspondence with the specifically discussed left hand connector 23 but is a mirror image thereof (see FIG. 8). Thus, connector 24 has a vertical portion corresponding to vertical portion 32 of connector 23 which is insertable downwardly through an opening in the corresponding hinge element 13, and preferably in loosely fitting relation as discussed, and whose lower end can be bent after insertion into the hinge element to a position corresponding to the broken line horizontally extending position represented at 35 in FIG. 4 to lock the parts in assembled relation. Wire 24 also forms a stop shoulder similar to that illustrated at 37, and which prevents counterclockwise swinging movement of tube 20 beyond the position represented in FIG. 1, but permits clockwise pivotal movement to a position in which tube 20 is closely adjacent frame 111. Wire 24 also has a doubled back portion corresponding to that illustrated at 27, 28 and 29 in connection with connector 23, and is retained in position by bonded regions corresponding to those shown at 26 and 30.

Figure 7:
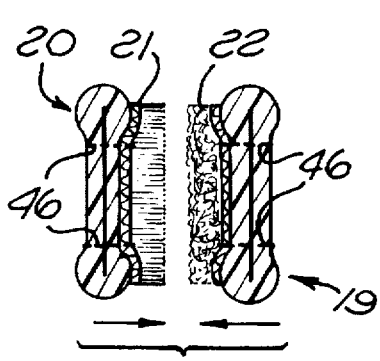
FIG. 7 is an enlarged vertical section taken on line 7—7 of FIG. 1.

At their rear ends, tubes 19 and 20 have flattened portions at which front and rear sides of each of the tubes are ultrasonically or otherwise bonded continuously together in sealed relation preventing communication between the interior and exterior of the tubes. In FIG. 1, the flattened bonded region of tube 19 extends from the location 42 to the end 43 of the tube, and the flattened sealed region of tube 20 extends from the location 44 to the end 45 of that tube. The velcro pads 21 and 22 are stitched to the flattened portions of tubes 19 and 20, as represented at 46 in FIG. 7. As will be understood, one of these velcro pads has a large number of hooks formed on its surface while the other pad has a large number of loops, with the hooks and loops being adapted to attach the pads together in any of different adjusted positions for varying the effective length of the combined tubes 19 and 20.

Tubes 19 and 20 contain air or another gas, typically at atmospheric pressure, and are imperforate and sealed at their opposite ends by bonding at locations 30 and their rear flattened ends. As a result, air cannot flow into or out of tubes 19 and 20. The presence of air within the tubes enables those tubes to act as flotation elements which will support the device 10 and the attached forward eyeglass structure 11 on a body of water if the assembly is dropped into the water.

To describe somewhat more specifically the manner of use of the device 10, assume that temples 12 are initially connected to forward frame structure 11 by two screws 15. The person wishing to convert the assembly for use of the device 10 removes screws 15 from frame 11, allowing detachment of temples 12. At this initial stage prior to attachment of the device 10 to the eyeglass frame, the vertical portions 32 of connector elements 23 and 24 at the forward ends of tubes 19 and 20 are straight through their entire lengths down to their lower extremities, as represented in full lines in FIG. 4. The user can then insert projections 32 downwardly through openings 14 in the two hinge elements 13, after which the bottom portion of each of the wires can be bent to the horizontally extending position represented at 35 in FIG. 4 (and shown in FIG. 8), retaining the device 10 against detachment from the forward frame structure 11. With the rear ends of tubes 19 and 20 separated from one another, a user places the forward frame structure 11 in proper position in front of his eyes, and then pulls tubes 19 and 20 to positions closely adjacent the sides of his head so that the velcro pads 21 and 22 may be brought into contact at the back of the head in a manner retaining the entire device 10 and forward structure 11 in proper position. The assembly may be detached by simply separating the two velcro pads from one another. Also, the velcro pads may be connected together in a more loosely fitting condition in which the device 10 is capable of hanging the forward structure 11 about the neck of a user.

While a certain specific embodiment of the present invention has been disclosed as typical, the invention is not limited to this particular form, but rather is applicable broadly to all such variations as fall within the scope of the appended claims.

I claim:

1. An eyewear retainer to be substituted for the temples of an eyeglass assembly, which assembly initially includes a forward structure having lenses and a first pair of hinge elements containing openings, and also initially includes a second pair of hinge elements containing openings and carried by the temples for initial attachment of the temples to the forward structure by fasteners extending through said openings in the first and second hinge elements, said retainer comprising:

elongated, hermetically sealed elements to extend rearwardly from said forward structure at opposite sides of a user's head and filled with a gas; and connectors carried by said elongated elements at forward ends thereof and having projections adapted to be inserted through said openings in said first hinge elements and be retained therein to attach said elongated elements to said forward structure, whereby said temples may be detached from said forward structure and said projections engaged with said hinge elements to attach the connectors to the forward structure.

2. An eyewear retainer as recited in claim 1, in which said projections of said connectors have end portions adapted to be bent to positions retaining said projections against removal from said openings in said first hinge elements.

3. An eyewear retainer as recited in claim 1, in which said projections are adapted to be inserted downwardly through said openings in the first hinge elements and have lower end portions adapted to be bent generally horizontally to positions preventing upward removal of the projections from said openings in the first hinge elements.

4. An eyewear retainer as recited in claim 1, in which said projections are pivotally movable within said openings in the first hinge elements, and said connectors have portions which are engageable with said forward structure in a relation limiting pivotal movement of the projections within said openings.

5. An eyewear retainer as recited in claim 1, in which each of said connectors is a wire having an end portion forming said projection and which is insertable downwardly within said opening in the corresponding first hinge element and is pivotally movable therein, said wire having a lower extremity adapted to be bent to a position retaining the wire against removal from the corresponding first hinge element, and said wire of each connector having an additional portion bent to form a stop shoulder limiting pivotal movement of said projection within said opening in the corresponding first hinge element.

6. An eyewear retainer as recited in claim 1, in which said elongated elements are flexible tubes, and said connectors have portions extending into forward ends of said tubes and retained therein.

7. An eyewear retainer as recited in claim 1, in which said elongated elements are flexible tubes, and said connectors are wires extending into said tubes and each having upper and lower portions within the corresponding tube joined by a return bend portion of the wire within the tube.

8. An eyewear retainer as recited in claim 1, in which said elongated elements are flexible tubes, and said connectors are wires extending into said tubes and each having upper and lower portions within the corresponding tube joined by a return bend portion of the wire within the tube, each of said wires being secured to the corresponding tube by bonding of opposite sides of the tube together vertically between said upper and lower portions of the wire and forwardly of said return bend portion.

9. An eyewear retainer as recited in claim 1, in which said elongated elements are flexible tubes, and said connectors are wires extending into said tubes and retained therein by bonding of opposite sides of the tubes together.

10. A retainer for use with an eyeglass structure having two lenses and having two hinge elements at opposite sides of the lenses containing hinge openings, said retainer comprising:

two flexible tubes to be received at opposite sides of a user's head;

two wires attached to forward ends of said tubes and having portions adapted to be received within said openings in the two hinge elements respectively and be retained therein in a relation attaching said tubes to the hinge elements, said wires defining respective stop shoulders to cooperate with said eyeglass structure to limit the degree of pivotal movement of the respective flexible tubes relative to said eyeglass structure; and two hook and loop connector pads attached to rear end portions of said tubes respectively and adapted to be detachably and adjustably connected together at the back of the user's head to hold said eyeglass structure in place in front of the user's eyes.

11. A retainer as recited in claim 10, in which each of said wires has a portion projecting into the forward end of a corresponding one of said tubes and secured thereto.

12. A retainer as recited in claim 10, in which each of said wires extends into the forward end of a corresponding one of said tubes and has upper and lower portions within the tube jointed by a return bend portion of the wire.

13. A retainer as recited in claim 10, in which each of said wires extends into the forward end of a corresponding one of said tubes and has upper and lower portions within the tube joined by a return bend portion of the wire, each of said wires being secured to the corresponding tube by bonding of opposite sides of the tube together vertically between said upper and lower portions of the wire and forwardly of said return bend portion.

14. A retainer as recited in claim 10, in which each of said wires has an end adapted to be bent to a position retaining the wire against removal from said opening in the corresponding hinge element.

15. A retainer as recited in claim 10, in which said wires are pivotally movable within said openings in the hinge elements and have portions shaped to engage said frame in a relation limiting pivotal movement of the wires relative to the hinge elements.

16. A retainer as recited in claim 10, in which said portion of each of said wires extends vertically downwardly through said opening in the corresponding hinge element and has a lower end adapted to be bent essentially horizontally to secure the wire against removal from the hinge element, each wire having a stop portion at the upper end of the corresponding hinge element which extends first forwardly, then laterally and then rearwardly for attachment to the corresponding tube and which limits pivotal movement of the wire within the hinge element.

17. A retainer as recited in claim 16, in which each of said wires extends into the forward end of a corresponding one of said tubes and has upper and lower portions within the tube joined by a return bend portion of the wire.

18. A retainer as recited in claim 17, in which said tubes contain air or another gas and are sealed against communication between the interior and exterior of the tubes.

19. Eyewear retaining means comprising:

two lengths of flexible tubing to be attached to opposite sides of an eyeglass structure for retaining the structure on a user;

said lengths of tubing containing air or another gas and being sealed against communication of the gas between the interior and exterior of the tubing.

20. An eyewear retainer assembly for releasable attachment to a forward structure of an eyeglass assembly, said forward structure having lenses and a first pair of hinge elements containing openings, said retainer comprising:

elongated elements for extension rearwardly from said forward structure at opposite sides of a user's head; and a plurality of connectors carried by said elongated elements at respective forward ends thereof and having projections adapted to be inserted through said openings in said first hinge elements and be retained therein to attach said elongated elements to said forward structure, each connector defining a stop shoulder to cooperate with said forward structure to limit the degree of pivotal movement of the respective said elongated elements relative to said forward structure.

21. An eyewear retainer to be substituted for the temples of an eyeglass assembly, which assembly initially includes a forward structure having lenses and a first pair of hinge elements containing openings, and also initially includes a second pair of hinge elements containing openings and carried by the temples for attachment of the temples to the forward structure by fasteners extending through said openings in the first and second hinge elements, said retainer comprising:

elongated elements to extend rearwardly from said forward structure at opposite sides of a user's head, said elongated elements comprising flexible tubing;

connectors carried by said elongated elements at forward ends thereof and having projections adapted to be inserted through said openings in said first hinge elements and be retained therein to attach said elongated elements to said forward structure; and said elongated elements each having a flattened portion disposed rearwardly of said respective connector and extending vertically to act as a hinge allowing flexure of said tubing about a vertical axis.

22. An eyewear retainer as recited in claim 21, in which said elongated elements are formed of a resinous plastic tubing having opposing side walls bonded together to form said flattened portions.

* * * * *